United States Patent
d'Estries

(10) Patent No.: US 7,057,268 B1
(45) Date of Patent: Jun. 6, 2006

(54) CAVITY CASE WITH CLIP/PLUG FOR USE ON MULTI-MEDIA CARD

(75) Inventor: Maximilien d'Estries, Mesa, AZ (US)

(73) Assignee: Amkor Technology, Inc., Chandler, AZ (US)

( * ) Notice: Subject to any disclaimer, the term of this patent is extended or adjusted under 35 U.S.C. 154(b) by 190 days.

(21) Appl. No.: 10/765,397

(22) Filed: Jan. 27, 2004

(51) Int. Cl.
H01L 21/44 (2006.01)

(52) U.S. Cl. .................................................. 257/679

(58) Field of Classification Search ................ 257/679, 257/678
See application file for complete search history.

(56) References Cited

U.S. PATENT DOCUMENTS

| | | | |
|---|---|---|---|
| 2,596,993 A | 5/1952 | Gookin | |
| 3,435,815 A | 4/1969 | Forcier | |
| 3,734,660 A | 5/1973 | Davies et al. | |
| 3,838,984 A | 10/1974 | Crane et al. | |
| 4,054,238 A | 10/1977 | Lloyd et al. | |
| 4,189,342 A | 2/1980 | Kock | |
| 4,258,381 A | 3/1981 | Inaba | |
| 4,289,922 A | 9/1981 | Devlin | |
| 4,301,464 A | 11/1981 | Otsuki et al. | |
| 4,332,537 A | 6/1982 | Slepcevic | |
| 4,417,266 A | 11/1983 | Grabbe | |
| 4,451,224 A | 5/1984 | Harding | |
| 4,530,152 A | 7/1985 | Roche et al. | |
| 4,541,003 A | 9/1985 | Otsuka et al. | |
| 4,646,710 A | 3/1987 | Schmid et al. | |
| 4,707,724 A | 11/1987 | Suzuki et al. | |
| 4,727,633 A | 3/1988 | Herrick | |
| 4,737,839 A | 4/1988 | Burt | |
| 4,756,080 A | 7/1988 | Thorp, Jr. et al. | |
| 4,812,896 A | 3/1989 | Rothgery et al. | |
| 4,862,245 A | 8/1989 | Pashby et al. | |
| 4,862,246 A | 8/1989 | Masuda et al. | |
| 4,907,067 A | 3/1990 | Derryberry | |
| 4,920,074 A | 4/1990 | Shimizu et al. | |
| 4,935,803 A | 6/1990 | Kalfus et al. | |
| 4,942,454 A | 7/1990 | Mori et al. | |
| 4,987,475 A | 1/1991 | Schlesinger et al. | |
| 5,018,003 A | 5/1991 | Yasunaga | |
| 5,029,386 A | 7/1991 | Chao et al. | |
| 5,041,902 A | 8/1991 | McShane | |
| 5,057,900 A | 10/1991 | Yamazaki | |
| 5,059,379 A | 10/1991 | Tsutsumi et al. | |
| 5,065,223 A | 11/1991 | Matsuki et al. | |
| 5,070,039 A | 12/1991 | Johnson et al. | |

(Continued)

FOREIGN PATENT DOCUMENTS

DE 19734794 A1 8/1997

(Continued)

Primary Examiner—Roy Potter
(74) Attorney, Agent, or Firm—Stetina Brunda Garred & Brucker

(57) ABSTRACT

An electronic device such as a storage device or memory card comprising a unitary case having opposed first and second sides, a closed first end, an open second end, and an interior chamber collectively defined by the first and second sides and the first end. Disposed within the second side of case is a window which communicates with the interior chamber thereof. Disposed within the interior chamber is a substrate having a plurality of contacts. The substrate is oriented within the interior chamber of the case such that the contacts are exposed within the window thereof. The substrate is maintained in a prescribed position relative to the case by a spring clip which is also advanced into the interior chamber and is cooperatively engaged to the substrate.

23 Claims, 5 Drawing Sheets

U.S. PATENT DOCUMENTS

| | | |
|---|---|---|
| 5,087,961 A | 2/1992 | Long et al. |
| 5,091,341 A | 2/1992 | Asada et al. |
| 5,096,852 A | 3/1992 | Hobson |
| 5,118,298 A | 6/1992 | Murphy |
| 5,122,860 A | 6/1992 | Kichuchi et al. |
| 5,134,773 A | 8/1992 | LeMaire et al. |
| 5,151,039 A | 9/1992 | Murphy |
| 5,157,475 A | 10/1992 | Yamaguchi |
| 5,157,480 A | 10/1992 | McShane et al. |
| 5,168,368 A | 12/1992 | Gow, 3rd et al. |
| 5,172,213 A | 12/1992 | Zimmerman |
| 5,172,214 A | 12/1992 | Casto |
| 5,175,060 A | 12/1992 | Enomoto et al. |
| 5,200,362 A | 4/1993 | Lin et al. |
| 5,200,809 A | 4/1993 | Kwon |
| 5,214,845 A | 6/1993 | King et al. |
| 5,216,278 A | 6/1993 | Lin et al. |
| 5,218,231 A | 6/1993 | Kudo |
| 5,221,642 A | 6/1993 | Burns |
| 5,250,841 A | 10/1993 | Sloan et al. |
| 5,252,853 A | 10/1993 | Michii |
| 5,258,094 A | 11/1993 | Furui et al. |
| 5,266,834 A | 11/1993 | Nishi et al. |
| 5,273,938 A | 12/1993 | Lin et al. |
| 5,277,972 A | 1/1994 | Sakumoto et al. |
| 5,278,446 A | 1/1994 | Nagaraj et al. |
| 5,279,029 A | 1/1994 | Burns |
| 5,281,849 A | 1/1994 | Singh Deo et al. |
| 5,294,897 A | 3/1994 | Notani et al. |
| 5,327,008 A | 7/1994 | Djennas et al. |
| 5,332,864 A | 7/1994 | Liang et al. |
| 5,335,771 A | 8/1994 | Murphy |
| 5,336,931 A | 8/1994 | Juskey et al. |
| 5,343,076 A | 8/1994 | Katayama et al. |
| 5,358,905 A | 10/1994 | Chiu |
| 5,365,106 A | 11/1994 | Watanabe |
| 5,381,042 A | 1/1995 | Lerner et al. |
| 5,391,439 A | 2/1995 | Tomita et al. |
| 5,406,124 A | 4/1995 | Morita et al. |
| 5,410,180 A | 4/1995 | Fujii et al. |
| 5,414,299 A | 5/1995 | Wang et al. |
| 5,417,905 A | 5/1995 | LeMaire et al. |
| 5,424,576 A | 6/1995 | Djennas et al. |
| 5,428,248 A | 6/1995 | Cha |
| 5,435,057 A | 7/1995 | Bindra et al. |
| 5,444,301 A | 8/1995 | Song et al. |
| 5,452,511 A | 9/1995 | Chang |
| 5,454,905 A | 10/1995 | Fogelson |
| 5,474,958 A | 12/1995 | Djennas et al. |
| 5,484,274 A | 1/1996 | Neu |
| 5,493,151 A | 2/1996 | Asada et al. |
| 5,508,556 A | 4/1996 | Lin |
| 5,517,056 A | 5/1996 | Bigler et al. |
| 5,521,429 A | 5/1996 | Aono et al. |
| 5,528,076 A | 6/1996 | Pavio |
| 5,534,467 A | 7/1996 | Rostoker |
| 5,539,251 A | 7/1996 | Iverson et al. |
| 5,543,657 A | 8/1996 | Diffenderfer et al. |
| 5,544,412 A | 8/1996 | Romero et al. |
| 5,545,923 A | 8/1996 | Barber |
| 5,581,122 A | 12/1996 | Chao et al. |
| 5,592,019 A | 1/1997 | Ueda et al. |
| 5,592,025 A | 1/1997 | Clark et al. |
| 5,594,274 A | 1/1997 | Suetaki |
| 5,595,934 A | 1/1997 | Kim |
| 5,604,376 A | 2/1997 | Hamburgen et al. |
| 5,608,265 A | 3/1997 | Kitano et al. |
| 5,608,267 A | 3/1997 | Mahulikar et al. |
| 5,625,222 A | 4/1997 | Yoneda et al. |
| 5,633,528 A | 5/1997 | Abbott et al. |
| 5,639,990 A | 6/1997 | Nishihara et al. |
| 5,640,047 A | 6/1997 | Nakashima |
| 5,641,997 A | 6/1997 | Ohta et al. |
| 5,643,433 A | 7/1997 | Fukase et al. |
| 5,644,169 A | 7/1997 | Chun |
| 5,646,831 A | 7/1997 | Manteghi |
| 5,650,663 A | 7/1997 | Parthasaranthi |
| 5,661,088 A | 8/1997 | Tessier et al. |
| 5,665,996 A | 9/1997 | Williams et al. |
| 5,673,479 A | 10/1997 | Hawthorne |
| 5,683,806 A | 11/1997 | Sakumoto et al. |
| 5,689,135 A | 11/1997 | Ball |
| 5,696,666 A | 12/1997 | Miles et al. |
| 5,701,034 A | 12/1997 | Marrs |
| 5,703,407 A | 12/1997 | Hori |
| 5,710,064 A | 1/1998 | Song et al. |
| 5,723,899 A | 3/1998 | Shin |
| 5,724,233 A | 3/1998 | Honda et al. |
| 5,726,493 A | 3/1998 | Yamashita |
| 5,736,432 A | 4/1998 | Mackessy |
| 5,745,984 A | 5/1998 | Cole, Jr. et al. |
| 5,753,532 A | 5/1998 | Sim |
| 5,753,977 A | 5/1998 | Kusaka et al. |
| 5,766,972 A | 6/1998 | Takahashi et al. |
| 5,770,888 A | 6/1998 | Song et al. |
| 5,776,798 A | 7/1998 | Quan et al. |
| 5,783,861 A | 7/1998 | Son |
| 5,801,440 A | 9/1998 | Chu et al. |
| 5,814,877 A | 9/1998 | Diffenderfer et al. |
| 5,814,881 A | 9/1998 | Alagaratnam et al. |
| 5,814,883 A | 9/1998 | Sawai et al. |
| 5,814,884 A | 9/1998 | Davis et al. |
| 5,817,540 A | 10/1998 | Wark |
| 5,818,105 A | 10/1998 | Kouda |
| 5,821,457 A | 10/1998 | Mosley et al. |
| 5,821,615 A | 10/1998 | Lee |
| 5,834,830 A | 11/1998 | Cho |
| 5,835,988 A | 11/1998 | Ishii |
| 5,844,306 A | 12/1998 | Fujita et al. |
| 5,856,911 A | 1/1999 | Riley |
| 5,859,471 A | 1/1999 | Kuraishi et al. |
| 5,866,939 A | 2/1999 | Shin et al. |
| 5,871,782 A | 2/1999 | Choi |
| 5,874,784 A | 2/1999 | Aoki et al. |
| 5,877,043 A | 3/1999 | Alcoe et al. |
| 5,886,397 A | 3/1999 | Ewer |
| 5,886,398 A | 3/1999 | Low et al. |
| 5,894,108 A | 4/1999 | Mostafazadeh et al. |
| 5,897,339 A | 4/1999 | Song et al. |
| 5,900,676 A | 5/1999 | Kweon et al. |
| 5,903,049 A | 5/1999 | Mori |
| 5,903,050 A | 5/1999 | Thurairajaratnam et al. |
| 5,909,053 A | 6/1999 | Fukase et al. |
| 5,915,998 A | 6/1999 | Stidham et al. |
| 5,917,242 A | 6/1999 | Ball |
| 5,939,779 A | 8/1999 | Kim |
| 5,942,794 A | 8/1999 | Okumura et al. |
| 5,951,305 A | 9/1999 | Haba |
| 5,959,356 A | 9/1999 | Oh |
| 5,969,426 A | 10/1999 | Baba et al. |
| 5,973,388 A | 10/1999 | Chew et al. |
| 5,976,912 A | 11/1999 | Fukutomi et al. |
| 5,977,613 A | 11/1999 | Takata et al. |
| 5,977,615 A | 11/1999 | Yamaguchi et al. |
| 5,977,630 A | 11/1999 | Woodworth et al. |
| 5,981,314 A | 11/1999 | Glenn et al. |
| 5,986,333 A | 11/1999 | Nakamura |
| 5,986,885 A | 11/1999 | Wyland |
| 6,001,671 A | 12/1999 | Fjelstad |
| 6,013,947 A | 1/2000 | Lim |
| 6,018,189 A | 1/2000 | Mizuno |
| 6,020,625 A | 2/2000 | Qin et al. |
| 6,025,640 A | 2/2000 | Yagi et al. |
| 6,031,279 A | 2/2000 | Lenz |

| | | | |
|---|---|---|---|
| RE36,613 E | 3/2000 | Ball |
| 6,034,423 A | 3/2000 | Mostafazadeh et al. |
| 6,040,626 A | 3/2000 | Cheah et al. |
| 6,043,430 A | 3/2000 | Chun |
| 6,060,768 A | 5/2000 | Hayashida et al. |
| 6,060,769 A | 5/2000 | Wark |
| 6,072,228 A | 6/2000 | Hinkle et al. |
| 6,075,284 A | 6/2000 | Choi et al. |
| 6,081,029 A | 6/2000 | Yamaguchi |
| 6,084,310 A | 7/2000 | Mizuno et al. |
| 6,087,715 A | 7/2000 | Sawada et al. |
| 6,087,722 A | 7/2000 | Lee et al. |
| 6,100,594 A | 8/2000 | Fukui et al. |
| 6,113,473 A | 9/2000 | Costantini et al. |
| 6,114,752 A | 9/2000 | Huang et al. |
| 6,118,174 A | 9/2000 | Kim |
| 6,118,184 A | 9/2000 | Ishio et al. |
| RE36,907 E | 10/2000 | Templeton, Jr. et al. |
| 6,130,115 A | 10/2000 | Okumura et al. |
| 6,130,473 A | 10/2000 | Mostafazadeh et al. |
| 6,133,623 A | 10/2000 | Otsuki et al. |
| 6,140,154 A | 10/2000 | Hinkle et al. |
| 6,143,981 A | 11/2000 | Glenn |
| 6,169,329 B1 | 1/2001 | Farnworth et al. |
| 6,177,718 B1 | 1/2001 | Kozono |
| 6,181,002 B1 | 1/2001 | Juso et al. |
| 6,184,465 B1 | 2/2001 | Corisis |
| 6,184,573 B1 | 2/2001 | Pu |
| 6,194,777 B1 | 2/2001 | Abbott et al. |
| 6,197,615 B1 | 3/2001 | Song et al. |
| 6,198,171 B1 | 3/2001 | Huang et al. |
| 6,201,186 B1 | 3/2001 | Daniels et al. |
| 6,201,292 B1 | 3/2001 | Yagi et al. |
| 6,204,554 B1 | 3/2001 | Ewer et al. |
| 6,208,020 B1 | 3/2001 | Minamio et al. |
| 6,208,021 B1 | 3/2001 | Ohuchi et al. |
| 6,208,023 B1 | 3/2001 | Nakayama et al. |
| 6,211,462 B1 | 4/2001 | Carter, Jr. et al. |
| 6,218,731 B1 | 4/2001 | Huang et al. |
| 6,222,258 B1 | 4/2001 | Asano et al. |
| 6,222,259 B1 | 4/2001 | Park et al. |
| 6,225,146 B1 | 5/2001 | Yamaguchi et al. |
| 6,229,200 B1 | 5/2001 | Mclellan et al. |
| 6,229,205 B1 | 5/2001 | Jeong et al. |
| 6,239,367 B1 | 5/2001 | Hsuan et al. |
| 6,239,384 B1 | 5/2001 | Smith et al. |
| 6,242,281 B1 | 6/2001 | Mclellan et al. |
| 6,256,200 B1 | 7/2001 | Lam et al. |
| 6,258,629 B1 | 7/2001 | Niones et al. |
| 6,281,566 B1 | 8/2001 | Magni |
| 6,281,568 B1 | 8/2001 | Glenn et al. |
| 6,282,095 B1 | 8/2001 | Houghton et al. |
| 6,285,075 B1 | 9/2001 | Combs et al. |
| 6,291,271 B1 | 9/2001 | Lee et al. |
| 6,291,273 B1 | 9/2001 | Miyaki et al. |
| 6,294,100 B1 | 9/2001 | Fan et al. |
| 6,294,830 B1 | 9/2001 | Fjelstad |
| 6,295,977 B1 | 10/2001 | Ripper et al. |
| 6,297,548 B1 | 10/2001 | Moden et al. |
| 6,303,984 B1 | 10/2001 | Corisis |
| 6,303,997 B1 | 10/2001 | Lee |
| 6,307,272 B1 | 10/2001 | Takahashi et al. |
| 6,309,909 B1 | 10/2001 | Ohgiyama |
| 6,316,822 B1 | 11/2001 | Venkateshwaran et al. |
| 6,316,838 B1 | 11/2001 | Ozawa et al. |
| 6,323,550 B1 | 11/2001 | Martin et al. |
| 6,326,243 B1 | 12/2001 | Suzuya et al. |
| 6,326,244 B1 | 12/2001 | Brooks et al. |
| 6,326,678 B1 | 12/2001 | Karnezos et al. |
| 6,335,564 B1 | 1/2002 | Pour |
| 6,337,510 B1 | 1/2002 | Chun-Jen et al. |
| 6,339,255 B1 | 1/2002 | Shin |
| 6,348,726 B1 | 2/2002 | Bayan et al. |
| 6,355,502 B1 | 3/2002 | Kang et al. |
| 6,369,447 B1 | 4/2002 | Mori |
| 6,369,454 B1 | 4/2002 | Chung |
| 6,373,127 B1 | 4/2002 | Baudouin et al. |
| 6,380,048 B1 | 4/2002 | Boon et al. |
| 6,384,472 B1 | 5/2002 | Huang |
| 6,388,336 B1 | 5/2002 | Venkateshwaran et al. |
| 6,395,578 B1 | 5/2002 | Shin et al. |
| 6,400,004 B1 | 6/2002 | Fan et al. |
| 6,410,979 B1 | 6/2002 | Abe |
| 6,414,385 B1 | 7/2002 | Huang et al. |
| 6,420,779 B1 | 7/2002 | Sharma et al. |
| 6,429,508 B1 | 8/2002 | Gang |
| 6,437,429 B1 | 8/2002 | Su et al. |
| 6,444,499 B1 | 9/2002 | Swiss et al. |
| 6,448,633 B1 | 9/2002 | Yee et al. |
| 6,452,279 B1 | 9/2002 | Shimoda |
| 6,459,148 B1 | 10/2002 | Chun-Jen et al. |
| 6,464,121 B1 | 10/2002 | Reijnders |
| 6,476,469 B1 | 11/2002 | Huang et al. |
| 6,476,474 B1 | 11/2002 | Hung |
| 6,482,680 B1 | 11/2002 | Khor et al. |
| 6,498,099 B1 | 12/2002 | McLellan et al. |
| 6,498,392 B1 | 12/2002 | Azuma |
| 6,507,096 B1 | 1/2003 | Gang |
| 6,507,120 B1 | 1/2003 | Lo et al. |
| 6,534,849 B1 | 3/2003 | Gang |
| 6,545,332 B1 | 4/2003 | Huang |
| 6,545,345 B1 | 4/2003 | Glenn et al. |
| 6,559,525 B1 | 5/2003 | Huang |
| 6,566,168 B1 | 5/2003 | Gang |
| 6,583,503 B1 | 6/2003 | Akram et al. |
| 6,603,196 B1 | 8/2003 | Lee et al. |
| 6,624,005 B1 | 9/2003 | Di Caprio et al. |
| 6,667,546 B1 | 12/2003 | Huang et al. |
| 6,910,635 B1 * | 6/2005 | Miks et al. ................. 235/487 |
| 2001/0008305 A1 | 7/2001 | Mclellan et al. |
| 2001/0014538 A1 | 8/2001 | Kwan et al. |
| 2002/0011654 A1 | 1/2002 | Kimura |
| 2002/0024122 A1 | 2/2002 | Jung et al. |
| 2002/0027297 A1 | 3/2002 | Ikenaga et al. |
| 2002/0140061 A1 | 10/2002 | Lee |
| 2002/0140068 A1 | 10/2002 | Lee et al. |
| 2002/0163015 A1 | 11/2002 | Lee et al. |
| 2003/0030131 A1 | 2/2003 | Lee et al. |
| 2003/0073265 A1 | 4/2003 | Hu et al. |

FOREIGN PATENT DOCUMENTS

| | | |
|---|---|---|
| EP | 5421117 | 6/1979 |
| EP | 5950939 | 3/1984 |
| EP | 0393997 | 10/1990 |
| EP | 0459493 | 12/1991 |
| EP | 0720225 | 3/1996 |
| EP | 0720234 | 3/1996 |
| EP | 0794572 A2 | 10/1997 |
| EP | 0844665 | 5/1998 |
| EP | 0936671 | 8/1999 |
| EP | 098968 | 3/2000 |
| EP | 1032037 | 8/2000 |
| JP | 55163868 | 12/1980 |
| JP | 5745959 | 3/1982 |
| JP | 58160095 | 8/1983 |
| JP | 59208756 | 11/1984 |
| JP | 59227143 | 12/1984 |
| JP | 60010756 | 1/1985 |
| JP | 60116239 | 8/1985 |
| JP | 60195957 | 10/1985 |
| JP | 60231349 | 11/1985 |
| JP | 6139555 | 2/1986 |
| JP | 629639 | 1/1987 |
| JP | 6333854 | 2/1988 |
| JP | 63067762 | 3/1988 |

| | | | | | | |
|---|---|---|---|---|---|---|
| JP | 63188964 | 8/1988 | | JP | 8125066 | 5/1996 |
| JP | 63205935 | 8/1988 | | JP | 8222682 | 8/1996 |
| JP | 63233555 | 9/1988 | | JP | 8306853 | 11/1996 |
| JP | 63249345 | 10/1988 | | JP | 98205 | 1/1997 |
| JP | 63289951 | 11/1988 | | JP | 98206 | 1/1997 |
| JP | 63316470 | 12/1988 | | JP | 98207 | 1/1997 |
| JP | 64054749 | 3/1989 | | JP | 992775 | 4/1997 |
| JP | 1106456 | 4/1989 | | JP | 9293822 | 11/1997 |
| JP | 1175250 | 7/1989 | | JP | 10022447 | 1/1998 |
| JP | 1205544 | 8/1989 | | JP | 10163401 | 6/1998 |
| JP | 1251747 | 10/1989 | | JP | 10199934 | 7/1998 |
| JP | 2129948 | 5/1990 | | JP | 10256240 | 9/1998 |
| JP | 369248 | 7/1991 | | JP | 00150765 | 5/2000 |
| JP | 3177060 | 8/1991 | | JP | 556398 | 10/2000 |
| JP | 4098864 | 9/1992 | | JP | 2001060648 | 3/2001 |
| JP | 5129473 | 5/1993 | | JP | 200204397 | 8/2002 |
| JP | 5166992 | 7/1993 | | KR | 941979 | 1/1994 |
| JP | 5283460 | 10/1993 | | KR | 9772358 | 11/1997 |
| JP | 692076 | 4/1994 | | KR | 100220154 | 6/1999 |
| JP | 6140563 | 5/1994 | | KR | 0049944 | 6/2002 |
| JP | 6260532 | 9/1994 | | WO | 9956316 | 11/1999 |
| JP | 7297344 | 11/1995 | | WO | 9967821 | 12/1999 |
| JP | 7312405 | 11/1995 | | | | |
| JP | 864634 | 3/1996 | | | | |
| JP | 8083877 | 3/1996 | | | | |

* cited by examiner

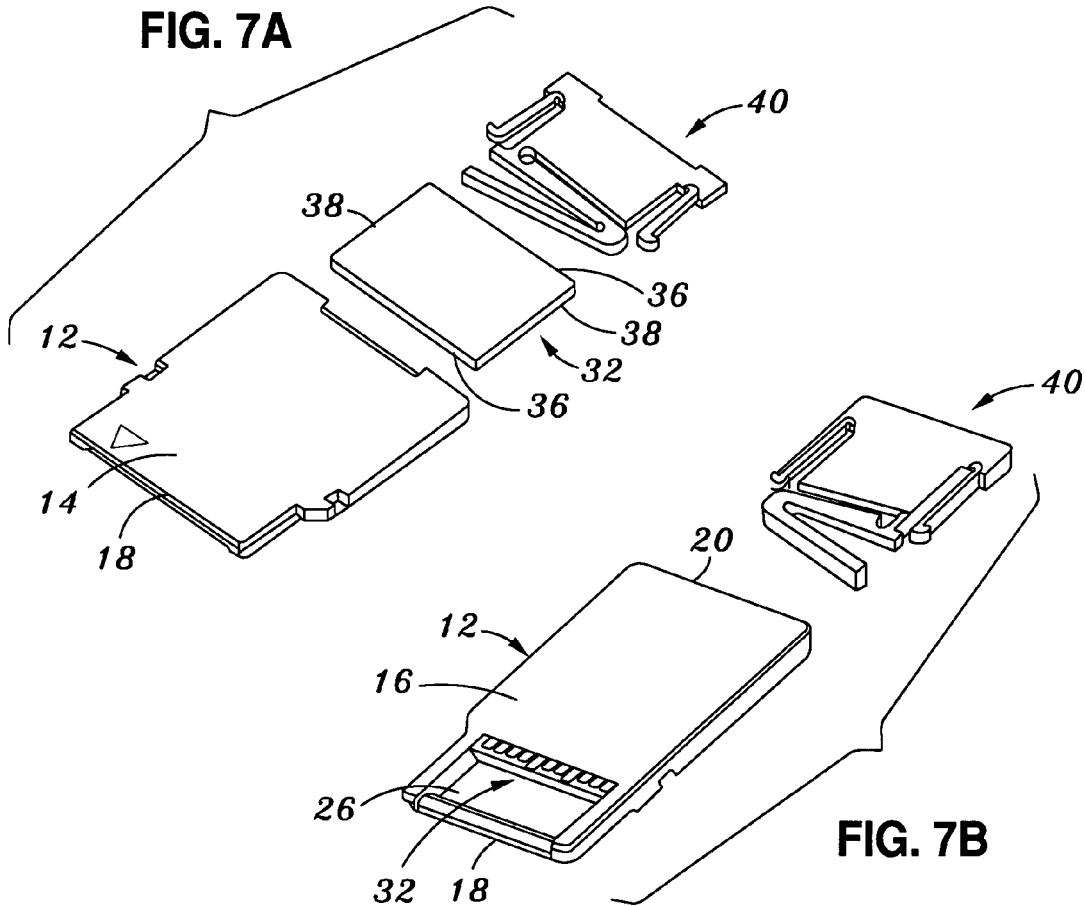
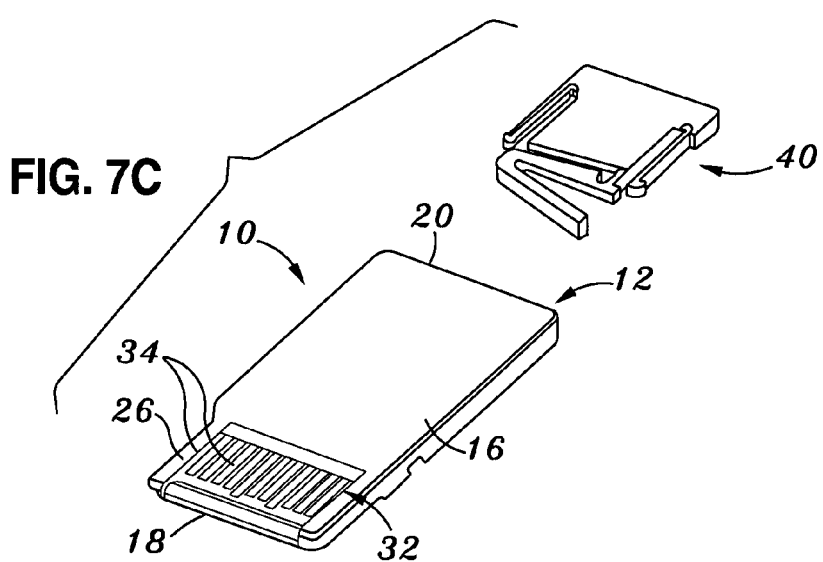

CAVITY CASE WITH CLIP/PLUG FOR USE ON MULTI-MEDIA CARD

CROSS-REFERENCE TO RELATED APPLICATIONS

Not Applicable

BACKGROUND OF THE INVENTION

The present invention relates generally to memory cards and, more particularly, to memory, game memory, and I/O cards which are fabricated through the use of an injection molded case alone or in combination with either a spring clip or a spacer.

As is well known in the electronics industry, memory cards and I/O cards are being used in increasing numbers to provide memory storage and other electronic functions for devices such as digital cameras, MP3 players, cellular phones, personal digital assistants, and hand-held video games. In this regard, memory cards are provided in various formats, including multi-media cards and secure digital cards.

Typically, memory cards and I/O cards comprise multiple integrated circuit devices or semiconductor dies. The semiconductor dies are interconnected using a circuit board substrate which adds to the weight, thickness, stiffness and complexity of the card. Memory cards and I/O cards also include electrical contacts for providing an external interface to an insertion point or socket. These electrical contacts are typically disposed on the backside of the circuit board substrate, with the electrical connection to the dies being provided by vias which extend through the circuit board substrate.

In an effort to simplify the process steps needed to fabricate the memory card, there has been developed by Applicant a memory card wherein a leadframe assembly is used as an alternative to the circuit board substrate. In this particular memory card, the leadframe and semiconductor die of the memory card are covered with an encaspulant which hardens into a cover or body of the memory card. The body is sized and configured to meet or achieve a "form factor" for the memory card. In the completed memory card, the contacts of the leadframe are exposed within a common surface of the body, with the die pad of the leadframe and the semiconductor die mounted thereto being disposed within or covered by the body.

The present invention provides a further, alternative simplified manufacturing process for a memory card or I/O card which employs the use of an injection molded case into which a substrate such as a lan grid array substrate is advanced. The substrate is anchored or maintained within the interior of the case through either the use of an adhesive, the use of an adhesive in conjunction with a spacer or plug, or the use of a spring clip without any adhesive, depending on the size of the substrate. These and other features of the present invention will be described in more detail below.

BRIEF SUMMARY OF THE INVENTION

In accordance with the present invention, there is provided a card such as a memory card, game memory card or I/O card which is assembled through the advancement of a substrate such as a lan grid array substrate into a case. The case is preferably a unitary structure which may be fabricated through the completion of an injection molding process. The case includes opposed, generally planar sides, a closed end, and an open end which provides access into an interior chamber collectively defined by the closed end and the opposed sides. Disposed within one of the sides of the cover is an aperture or window which communicates with the interior chamber. The substrate, which includes a plurality of terminals or contacts, is advanced into the interior chamber via the open end of the case. When the substrate is properly inserted into the case, the terminals or contacts are exposed within the window of the case.

In accordance with one embodiment of the present invention, the substrate is mounted or maintained in a prescribed position in the interior chamber of the case via a spring clip which is itself advanced into the interior chamber. The spring clip is cooperatively engageable to both the case and the substrate. In another embodiment of the present invention, the spring clip is substituted with a spacer which is itself advanced into the interior chamber of the case and cooperatively engaged to the substrate already inserted thereinto. Both the substrate and the spacer are mounted to the case through the use of an adhesive. In yet another embodiment of the present invention, both the spring clip and the spacer are completely eliminated, with the substrate being advanced into the interior chamber of the case and mounted to the case through the use of an adhesive. The elimination of the spring clip or spacer occurs when the size and configuration of the substrate closely mirrors that of the interior chamber.

The present invention is best understood by reference to the following detailed description when read in conjunction with the accompanying drawings.

BRIEF DESCRIPTION OF THE DRAWINGS

These, as well as other features of the present invention, will become more apparent upon reference to the drawings wherein:

FIGS. 7A–7C illustrate an exemplary sequence of steps by which the card of the first embodiment may be assembled;

Common reference numerals are used throughout the drawings and detailed description to indicate like elements.

DETAILED DESCRIPTION OF THE INVENTION

Figure 1:
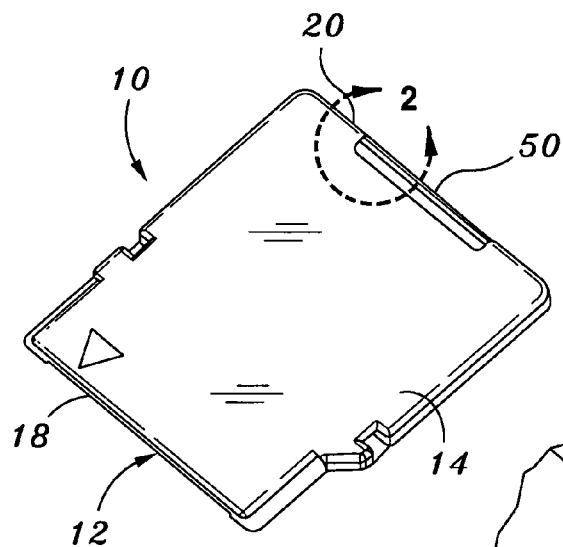
FIG. 1 is a top perspective view of a card constructed in accordance with a first embodiment of the present invention.
Figure 3:
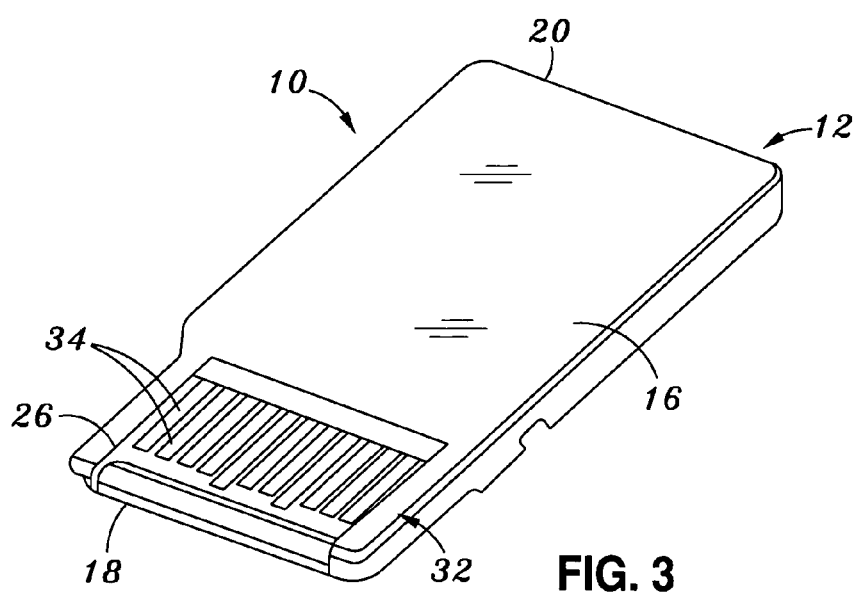
FIG. 3 is a bottom perspective view of the card of the first embodiment.
Figure 4:
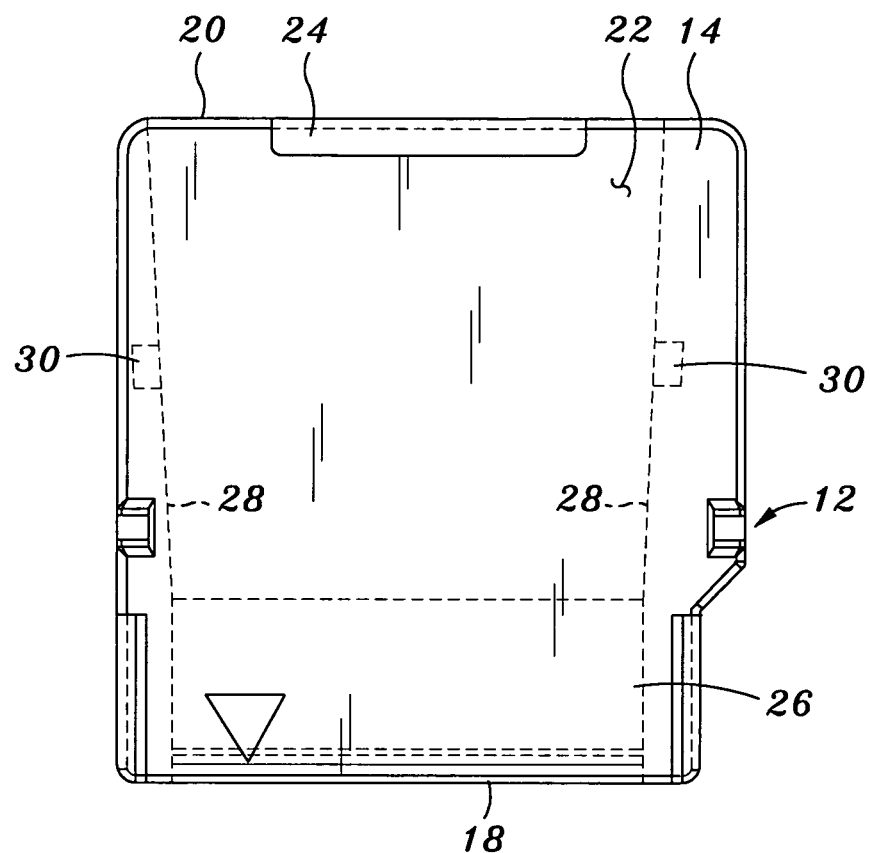
FIG. 4 is a top plan view of the case of the card of the first embodiment.
Figure 6:
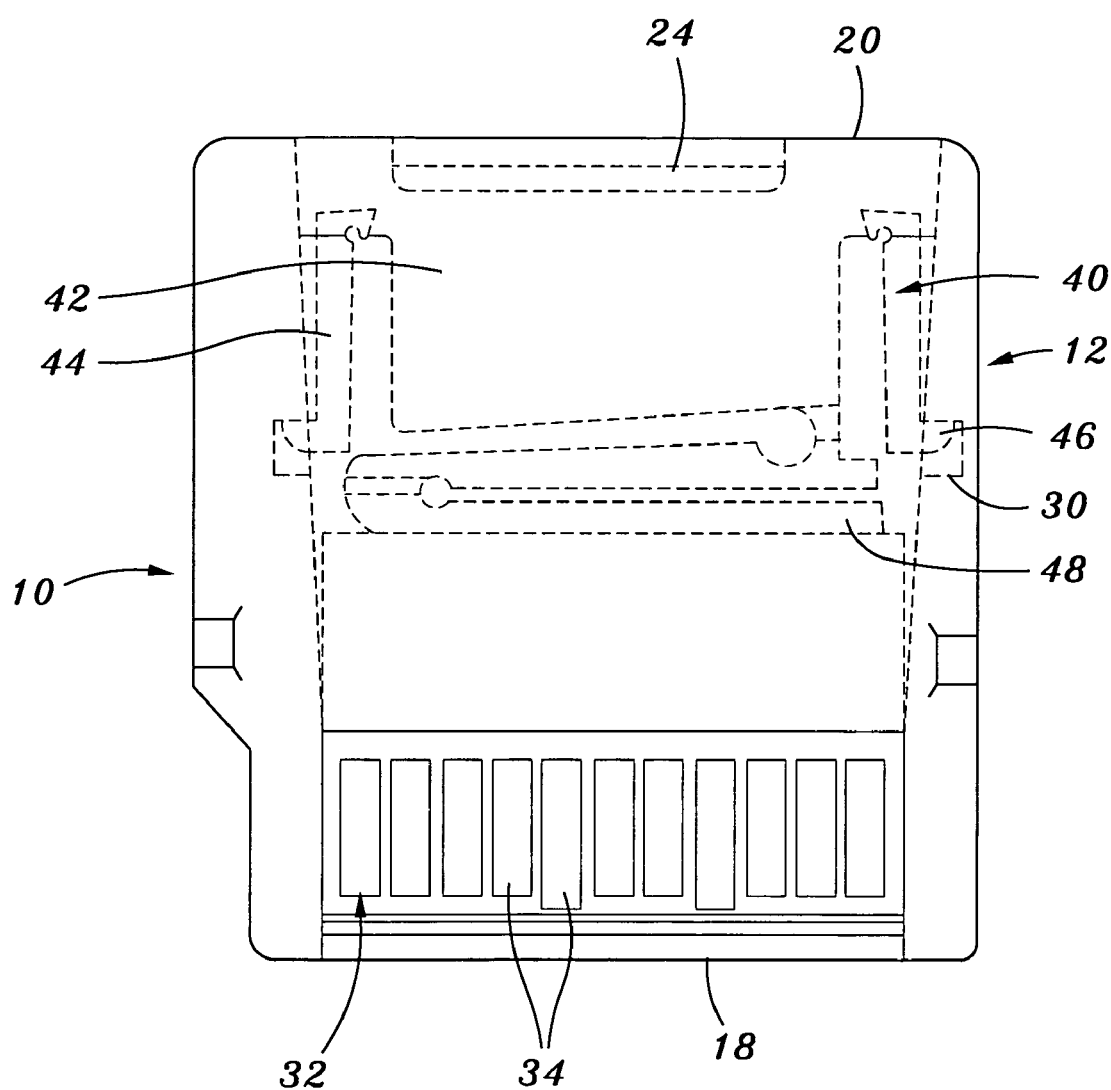
FIG. 6 is a bottom plan view of the card of the first embodiment.

Referring now to the drawings wherein the showings are for purposes of illustrating preferred embodiments of the present invention only, and not for purposes of limiting the same, FIGS. 1 and 3 provide top and bottom perspective views, respectively, of a card 10 constructed in accordance with a first embodiment of the present invention. The card 10 may be a memory card, a game memory card, an I/O card, or any other type of multi-media card. The card 10 comprises a case 12 which, as best seen in FIGS. 1, 3 and 6 has a generally planar first (top) side 14 and an opposed, generally planar second (bottom) side 16. In addition to the first and second sides 14, 16, the case 12 includes a closed first end 18 and an opposed, open second end 20. The first and second sides 14, 16 and closed first end 18 collectively define an interior chamber 22 of the case 12 which is best seen in FIG. 4. Disposed within the first side 14 of the case 12 is an elongate slot 24 which extends along a portion of the open second end 20 and communicates with the interior chamber 22. Additionally, disposed within the second side 16 of the case 12 is a generally quadrangular aperture or window 26 which itself communicates with the interior chamber 22. The window 26 is disposed in close proximity to closed first end 18 of the case 12. The use of both the slot 24 and window 26 will be discussed in more detail below.

As is best seen in FIG. 4, the interior chamber 22 of the case 12 has a tapered configuration. In the case 22, the first and second ends 18, 20 extend in spaced, generally parallel relation to each other. In addition to being partially defined by the first and second sides 14, 16 and closed first end 18, the interior chamber 22 is also partially defined by an opposed pair of side walls 28 of the case 12. Each of the side walls 28 has a first section which extends non-perpendicularly from the second end 20 and transitions to a second section which extends perpendicularly to the first end 18. In this regard, the first sections of the side walls 28 are inwardly sloped or tapered such that the distance separating the first sections gradually decreases as they extend from the second end 20 to the second sections. Since the second section of each side wall 28 extends generally perpendicularly relative to the first end 18 of the case 12, the distance separating the second sections of the side walls 28 from each other is substantially constant. The length of the second section of each side wall 28 is substantially equal to the width of the window 26 disposed within the second side 16 of the case 12.

In the case 12 of the card 10, disposed within the sloped first section of each side wall 28 is a cavity or notch 30. Notches 30, which each communicate with the interior chamber 22, are preferably oriented in opposed relation to each other. As Shown in FIG. 4, the notches 30 are positioned at approximately the centers of respective ones of the first sections of the side walls 28. However, as will be discussed in more detail below, each notch 30 may be positioned anywhere along the length of the first section of a respective side wall 28, depending on the size of other components which are interfaced to the case 12 to facilitate the assembly of the card 10.

In the card 10, it is contemplated that the case 12 will be fabricated as a unitary structure through the completion of an injection molding process. During such molding process, the interior chamber 22 is created as a result of the advancement of an elongate tongue or projection into the interior of the mold cavity which ultimately forms the case 12. The tongue or projection has a tapered configuration to assist in its removal from the fully formed case, such tapered configuration of the tongue or projection facilitating the resultant tapered configuration of the interior chamber 22 as described above. It is further contemplated that the case 12 will be fabricated from a suitable plastic material.

In addition to the case 12, the card 10 of the first embodiment comprises a substrate 32. The substrate 32 has a generally quadrangular configuration, and includes a plurality of elongate, conductive contacts or terminals 34 extending in spaced, generally parallel relation to each other on a common side thereof. The substrate 32 defines an opposed pair of first sides 36 and an opposed pair of second sides 38. The distance separating the second sides 38 of the substrate 32 from each other is substantially equal to, but slightly less than, the distance separating the spaced, generally parallel second sections of the side walls 28 from each other. Embedded within the substrate 32 is one or more semiconductor dies alone or in combination with one or more other passive electrical devices, the semiconductor die(s) and passive device(s) (if any) being electrically connected to the terminals 34 exposed in the common side of the substrate 32 in any desired pattern or arrangement. In the card 10, it is contemplated that the substrate 32 may comprise a lan grid array substrate.

In assembling the card 10, the substrate 32 is advanced into the interior chamber 22 of the case 12 via the open second end 20 thereof. Such advancement is continued until such time as one first side 36 of the substrate 32 is abutted against the closed first end 18 of the case 12. The substrate 32 and case 12 are sized and configured relative to each other such that the terminals 34 are placeable into registry with the window 26 when the substrate 32 is fully advanced into the interior chamber 22, i.e., the first side 36 of the substrate 32 disposed closest to the terminals 34 is abutted against the closed first end 18 of the case 12. Thus, the terminals 34 are completely exposed within the widow 26 of the case 12 when the substrate 32 is fully, properly inserted into the interior chamber 22 of the case 12.

Figure 5:
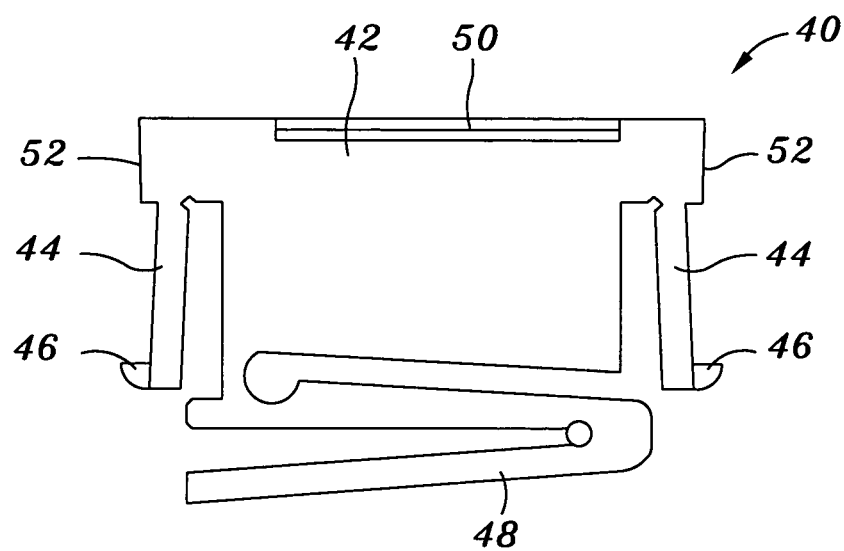
FIG. 5 is a top plan view of the spring clip of the card of the first embodiment.

Referring now to FIGS. 5 and 6, the card 10 of the first embodiment further comprises a spring clip 40 which is also advanced into the interior chamber 22 of the case 12, and is sized and configured to cooperatively engage the substrate 32 in a manner maintaining the substrate 32 in a prescribed position within the interior chamber 22, and more particularly the position whereat the terminals 34 are exposed within the window 26 of the case 12. The spring clip 40 comprises a main body 42. Integrally connected to and extending from the main body 42 in opposed relation to each other is a pair of elongate, resilient engagement arms 44. Integrally connected to and projecting laterally outwardly from the distal end of each engagement arm 44 is a locking tab 46. In addition to the engagement arms 44, also integrally connected to and extending from the main body 42 is a resilient biasing member 48 which has a generally V-shaped configuration. Formed on the main body 42 and extending partially along the edge thereof disposed furthest from the biasing member 48 is a nail edge portion 50. As best seen in FIG. 5, the engagement arms 44 of the spring clip 40 do not extend in parallel relation to each other, but rather are formed to have a slight outward flare.

In assembling the card 10, the spring clip 40 is advanced into the interior chamber 22 of the case 12 biasing member 48 first subsequent to the advancement of the substrate 32 into the interior chamber 22 in the above-described manner. As the spring clip 40 is advanced into the interior chamber 22, the eventual engagement of the rounded surfaces of the locking tabs 46 to respective ones of the sloped first sections of the side walls 28 facilitates the inward flexion of the engagement arms 44 as the locking tabs 46 thereof continue to travel along the first sections of the side walls 28. When the locking tabs 46 come to the notches 30 within the first sections of the side walls 28, the resultant outward flexion of the engagement arms 44 to their original, unflexed position facilitates the insertion of the locking tabs 46 into respective ones of the notches 30. Prior to the locking tabs 46 reaching the notches 30, the distal leg or prong of the biasing member 48 engages the first side 36 of the substrate 32 disposed furthest from the first end 18 of the case 12. Subsequent to the engagement of such prong or arm to the corresponding first side 36 of the substrate 32, the continued advancement of the spring clip 40 into the interior chamber 22 facilitates the compression of the distal prong of the biasing member 48 toward the remaining prong, and resultant application of an outward biasing force to the substrate 32 as effectively maintains the same in firm engagement to the closed first end 18 of the case 12. As will be recognized, the compressive pressure exerted by the spring clip 40 against the substrate 32 is maintained as a result of the attachment of the spring clip 40 to the case 12 as occurs when the locking tabs 46 of the engagement arms 44 are inserted into respective ones of the notches 30 in the above-described manner.

Figure 2:
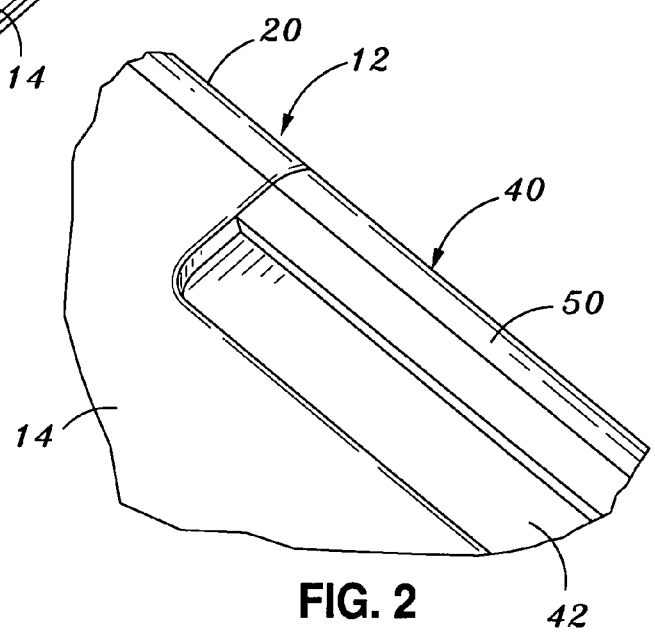
FIG. 2 is an enlargement of the encircled region 2 shown in FIG. 1.

As will be recognized, the case 12, spring clip 40, and substrate 32 are sized and configured relative to each other such that the compression of the prongs of the biasing member 48 and hence the application of biasing force to the substrate 32 occurs prior to the insertion of the locking tabs 46 of the engagement arms 44 into the notches 30 of the case 12. When the spring clip 40 is fully inserted into the interior chamber 22 and engaged to the case 12, the main body 42 of the spring clip 40 does not protrude beyond the open second end 20 of the case 12. However, the nail edge portion 50 formed on the main body 42 is exposed in the slot 24 of the case 12, as is best shown in FIGS. 1, 2 and 6. As is also seen in FIG. 6, the outermost side edges 52 of the main body 42 of the spring clip 40 each have tapers which are complimentary to those of the first sections of the side walls 28, thus facilitating firm engagement between the side edges 52 and side walls 28 when the spring clip 40 is fully inserted into the interior chamber 22.

Those of ordinary skill in the art will recognize that the size of the spring clip 40 as shown in FIGS. 4 and 6 is exemplary only, in that such size may be varied according to the size of the substrate 32. For example, if a substrate larger than the substrate 32 (i.e., of increased length between the sided 36) is to be inserted into the case 12, the size of the corresponding spring clip 40 would be smaller. More particularly, the length of the main body 42 of such alternative spring clip 40 between the nail edge portion 50 and biasing member 48 would be shorter, as would the lengths of the engagement arms 44 of such alternative spring clip 40. As a result of the reduced length of the engagement arms 44, the case 12 which would accommodate such alternative spring clip 40 would also have a configuration differing from that of the case 12 shown in FIGS. 4 and 6. More particularly, the location of the notches 30 in such alternative case 12 would be more toward the second end 20 to correspond to the reduced lengths of the engagement arms 44 in the alternative spring clip 40. Along these same lines, the notches 30 may also be formed in the case 12 to be closer to the first end 18 of the case 12 as compared to the locations of the notches 30 shown in FIGS. 4 and 6 in the event a spring clip 40 larger than that shown in FIGS. 5 and 6 is used in conjunction with a substrate having a length which is less than that of the length of the substrate 32.

FIGS. 7A, 7B and 7C illustrate the sequence of steps which is preferably used to facilitate the assembly of the card 10. In the initial stage of such assembly, the substrate 32 is advanced into the interior chamber 22 of the case 12 in the above-described manner. Subsequent to the full insertion of the substrate 32 into the interior chamber 22 such that the terminals 34 are exposed in the window 26, the spring clip 40 is fully inserted into the interior chamber 22 in the above-described manner. In the fully assembled card 10, the exposure of the nail edge portion 50 of the spring clip 40 in the notch 30 of the case 12 is used to provide a grip which assists in the removal of the card 10 from a host socket.

Figure 8:
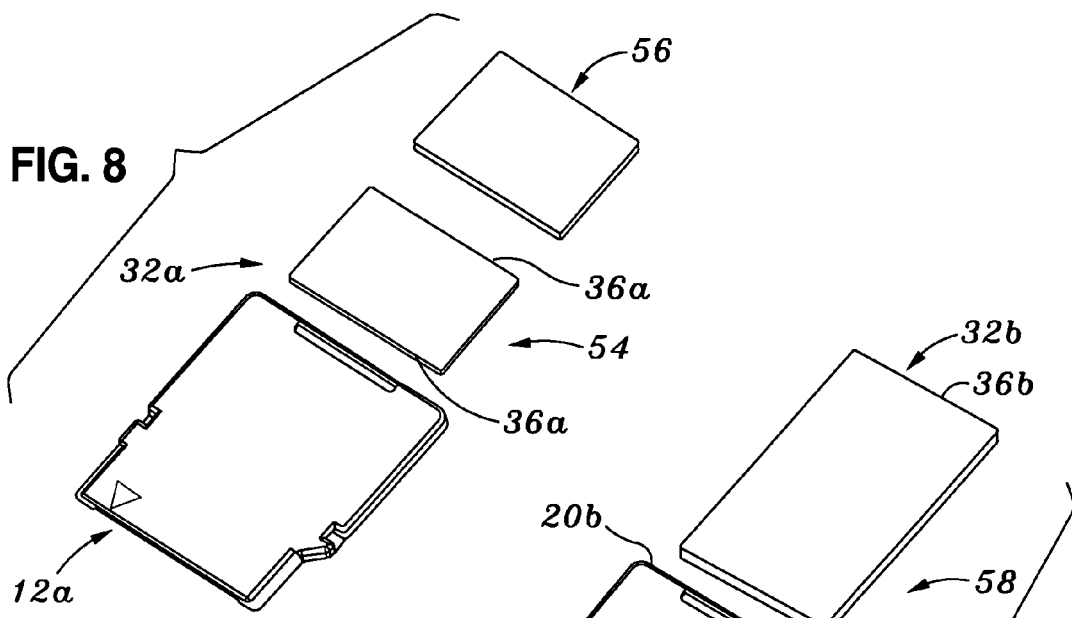
FIG. 8 is an exploded view of a card constructed in accordance with a second embodiment of the present invention.
Figure 9:
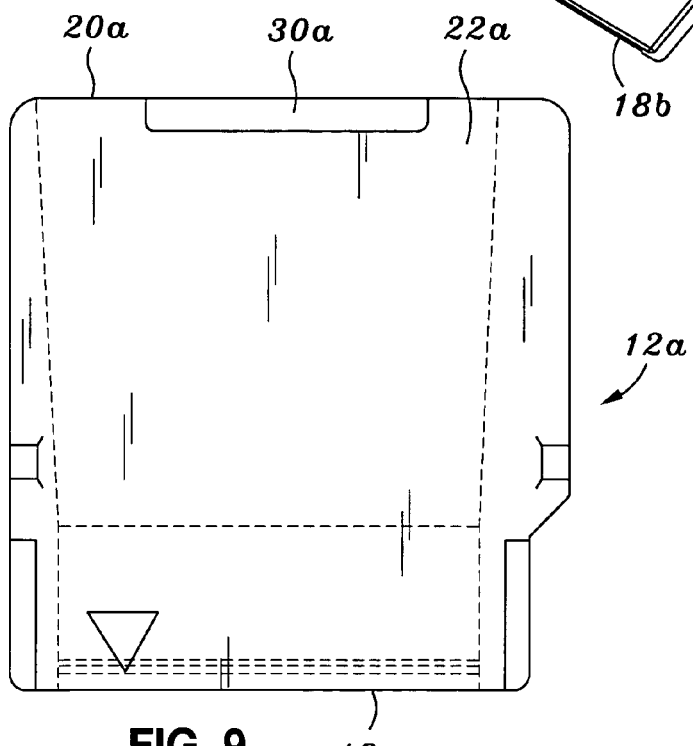
FIG. 9 is a top plan view of the case of the card of the second embodiment.

Referring now to FIG. 8, there is shown a card 54 constructed in accordance with a second embodiment of the present invention. The card 54 itself includes a case 12a which is shown in FIG. 9. The case 12a is substantially similar in configuration to the above-described case 12, with the sole distinction being that the case 12a does not include the above-described notches 30. A further distinction between the card 54 and the card 10 lies in the substitution of the spring clip 40 of the card 10 with a plug or spacer 56 in the card 54. In addition to the case 12a and spacer 56, the card 54 includes a substrate 32a which is analogous to the substrate 32 described above in relation to the card 10.

In assembling the card 54, the substrate 32a is inserted into the interior chamber 22a of the case 12a in the same manner described above in relation to the insertion of the substrate 32 into the case 12 in the card 10. However, in the card 54, the substrate 32a is rigidly mounted to the case 12a to maintain the substrate 32a in the proper position within the interior chamber 22a. The mounting of the substrate 32a to the case 12a is preferably accomplished through the use of an adhesive. Such adhesive may be pre-applied to the substrate 32a prior to the advancement thereof into the interior chamber 22a of the case 12a, or may alternatively be injected into the interior chamber 22a prior to the advancement of the substrate 32a thereinto. Contemplated adhesives include a pressure sensitive film and a B-staged material which reflows a temperature but is solid at room temperature.

Subsequent to the substrate 32a being inserted into the interior chamber 22a and mounted to the case 12a in the above-described manner, the spacer 56 is then advanced into the interior chamber 22a of the case 12a. The spacer 56 is sized and configured to fill the space within the interior chamber 22a which is defined between the open second end 20a of the case 12a and the first side 36a of the substrate 32a which is disposed furthest from the closed first end 18a of the case 12a. Like the substrate 32a, the spacer 56 is mounted to the case 12a through the use of an adhesive which is either pre-applied to the spacer 56 or injected into the interior chamber 22a. The spacer 56 is further preferably sized such that when advanced into the interior chamber 22a and secured to the case 12a, no portion of the spacer 56 protrudes beyond the second end 20a of the case 12a. Though not shown, the spacer 56 may optionally be provided with a nail edge portion similar to the nail edge portion 50 shown and described above in relation to the spring clip 40, such nail edge portion of the spacer 56 being exposed in the notch 30a of the case 12a when the spacer 56 is advanced into the interior chamber 22a and secured to the case 12a. Such nail edge portion of the spacer 56 would also be used to assist in the removal of the card 54 from a host socket. Those of ordinary skill in the art will recognize that the size of the spacer 56 may be varied as needed to correspond to the size of the substrate 32a.

Figure 10:
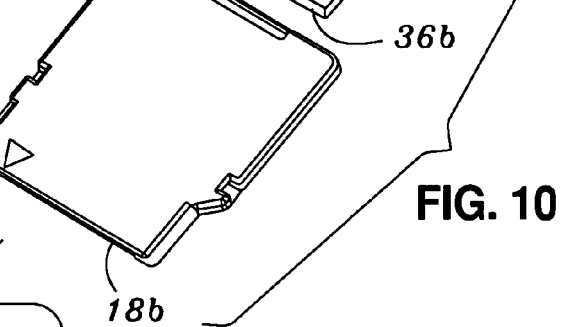
FIG. 10 is an exploded view of a card constructed in accordance with a third embodiment of the present invention.

Referring now to FIG. 10, there is shown a card 58 constructed in accordance with a third embodiment of the present invention. The card 58 includes a case 12b which is identically configured to the case 12a of the card 54 of the second embodiment. The distinction between the card 58 and the card 54 lies in the omission of the spacer 56 from the card 58. In this regard, the spacer 56 is omitted as a result of the increased size of the substrate 32b in the card 58 in comparison to the size of the substrate 32a of the card 54 and the substrate 32 of the card 10.

In the card 58, the substrate 32b is fully advanced into the interior chamber of the case 12b such that the first side 36b disposed closest to the terminals of the substrate 32b is abutted against the first end 18b of the case 12b. The case 12b and substrate 32b are preferably sized relative to each other such that the remaining, opposed first side 36b of the substrate 32b extends to but does not protrude beyond the second end 20b of the case 12b. Like the substrate 32a, the substrate 32b is preferably mounted to the case 12b through the use of an adhesive which is either pre-applied to the substrate 32b, or pre-applied to the interior of the case 12b. It is contemplated that any fill/pot draft space defined between the case 12b and the substrate 32b subsequent to the advancement of the substrate 32b into the interior chamber of the case 12b may be filled with adhesive. Those of ordinary skill in the art will recognize that the size of the case 12b may be varied as is needed to accommodate the length of the substrate 32b. Similarly, the size of the spacer 56 may be varied as needed to correspond to the size of the substrate 32a.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. An electronic device, comprising:
   a unitary case having:
      opposed first and second sides;
      a closed first end;
      an open second end;
      an interior chamber collectively defined by the first and second sides and the first end; and
      a window disposed within the second side and communicating with the interior chamber;
   a substrate having a plurality of contacts, the substrate being disposed within the interior chamber and attached to the case such that the contacts are exposed within the window.

2. The device of claim 1 wherein the substrate comprises a lan grid array substrate.

3. The device of claim 1 wherein the substrate is attached to the case through the use of an adhesive.

4. The device of claim 1 wherein the case further includes an elongate slot which is disposed in the first side and extends along a portion of the second end.

5. The device of claim 4 wherein the case and the substrate are sized relative to each other such that the substrate does not protrude from the second end of the case, and a portion of the substrate is exposed in the slot of the case.

6. The device of claim 1 wherein:
   the substrate has a generally quadrangular configuration and a maximum substrate width; and
   the interior chamber has a tapered configuration and is of a first chamber width at the second end which exceeds the substrate width, and a second chamber width at the first end which is less than the first chamber width.

7. A memory card, comprising:
   a case having:
      opposed first and second sides;
      a closed first end;
      an open second end;
      an interior chamber collectively defined by the first and second sides and the first end; and
      a window disposed within the second side and communicating with the interior chamber;
   a substrate having a plurality of contacts, the substrate being disposed within the interior chamber and attached to the case such that the contacts are exposed within the window; and
   a spacer disposed within the interior chamber and attached to the case, the spacer being cooperatively engaged to the substrate.

8. The memory card of claim 7 wherein the substrate comprises a lan grid array substrate.

9. The memory card of claim 7 wherein the substrate and the spacer are each attached to the case through the use of an adhesive.

10. The memory card of claim 7 wherein the case further includes an elongate slot which is disposed in the first side and extends along a portion of the second end.

11. The memory card of claim 10 wherein the case, the substrate, and the spacer are sized relative to each other such that neither the substrate nor the spacer protrudes from the second end of the case, and a portion of the spacer is exposed in the slot of the case.

12. The memory card of claim 11 wherein the spacer includes a nail edge portion which is exposed in the slot.

13. The memory card of claim 7 wherein:
   the substrate has a generally quadrangular configuration and a maximum substrate width;
   the spacer has a generally quadrangular configuration and a maximum spacer width; and
   the interior chamber has a tapered configuration and is of a first chamber width at the second end which exceeds the substrate width and the spacer width, and a second chamber width at the first end which is less than the first chamber width.

14. The memory card of claim 7 wherein the case is a unitary structure.

15. An electronic device, comprising:
   a case having:
      opposed first and second sides;
      a closed first end;
      an open second end;
      an interior chamber collectively defined by the first and second sides and the first end; and
      a window disposed within the second side and communicating with the interior chamber;
   a substrate having a plurality of contacts, the substrate being disposed within the interior chamber such that the contacts contacts are exposed within the window; and
   a spring clip disposed within the interior chamber and cooperatively engaged to both the substrate and the case, the spring clip being operative to maintain the substrate in a prescribed position within the interior chamber when cooperatively engaged to the case.

16. The device of claim 15 wherein the substrate comprises a lan grid array substrate.

17. The device of claim 15 wherein the case further includes an elongate slot which is disposed in the first side and extends along a portion of the second end.

18. The device of claim 17 wherein the case, the substrate and the spring clip are sized relative to each other such that neither the substrate or the spring clip protrude from the second end of the case and a portion of the spring clip is exposed in the slot of the case.

19. The device of claim 18 wherein the spring clip includes a nail edge portion which is exposed in the slot.

20. The device of claim 15 wherein:
the substrate has a generally quadrangular configuration and a maximum substrate width; and
the interior chamber has a tapered configuration and is of a first chamber width at the second end which exceeds the substrate width and a second chamber width at the first end which is less than the first chamber width.

21. The device of claim 20 wherein:
the case includes an opposed pair of notches which each communicate with the interior chamber; and
the spring clip includes an opposed pair of resilient engagement arms which are partially insertable into respective ones of the notches when the spring clip is advanced into the interior chamber.

22. The device of claim 21 wherein the spring clip further comprises a resilient biasing member which is sized and configured to apply compressive pressure to the substrate when the engagement arms are inserted into respective ones of the notches.

23. The device of claim 15 wherein the case is a unitary structure.

* * * * *